E. O. COLLINS.
DUST CAP AND SLEEVE FOR INFLATING VALVE TUBES.
APPLICATION FILED SEPT. 16, 1919.
1,398,316.   Patented Nov. 29, 1921.
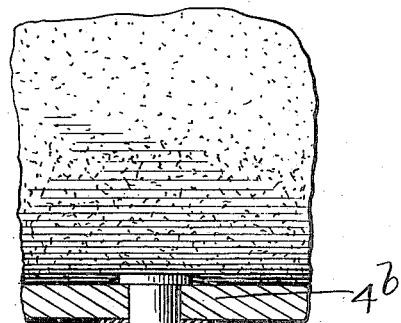
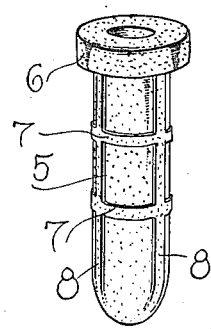
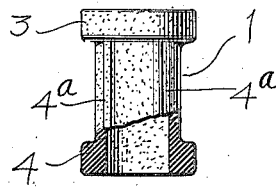
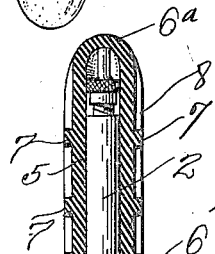
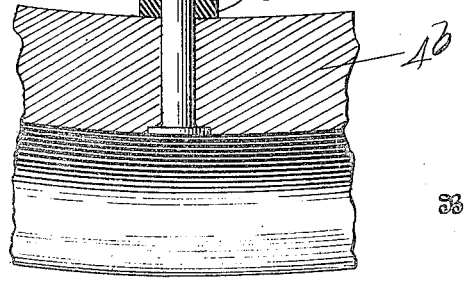
Inventor
Elba O. Collins
By Watson E. Coleman
Attorney

UNITED STATES PATENT OFFICE.

ELBA O. COLLINS, OF CHILLICOTHE, OHIO.

DUST-CAP AND SLEEVE FOR INFLATING VALVE-TUBES.

1,398,316.  Specification of Letters Patent.  Patented Nov. 29, 1921.

Application filed September 16, 1919. Serial No. 324,091.

*To all whom it may concern:*

Be it known that I, ELBA O. COLLINS, a citizen of the United States, residing at Chillicothe, in the county of Ross and State of Ohio, have invented certain new and useful Improvements in Dust-Caps and Sleeves for Inflating Valve-Tubes, of which the following is a specification, reference being had to the accompanying drawings.

This invention relates to an improved rubber dust cap and rubber sleeve for inflating valve stems of tires, and as the primary object of the invention it is the aim to provide a device of this kind, which is simple, efficient and practical in construction, to avoid dust and the like from entering the inflating valve stem, and furthermore, may be manufactured for a relatively low cost and sold at a reasonable profit.

A further object of the invention is to provide a dust cap and sleeve constructed from vulcanized rubber or other similar resilient material, which will perform the function of keeping out the dust, dirt and the like more efficiently than performed by other dust caps and sleeves, which are made of metal and the like.

A still further object of the invention is to provide a dust cap and sleeve composed of vulcanized rubber adapted to fit telescopically upon an inflating valve stem tube, and having a clamping and vacuum connection with the tube, in order to hold the dust cap in place.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a sectional view through a portion of a rim of a wheel showing a tire, and illustrating an inflating valve stem, to which the dust cap and sleeve are applied.

Fig. 2 is an enlarged detail perspective view of the dust cap removed.

Fig. 3 is an enlarged detail view of the rubber sleeve removed.

Fig. 4 is a sectional view through a portion of the wood rim of a wheel, showing a part of the tire and the inflating valve stem, and illustrating the dust cap as applied to the stem.

Referring more especially to the drawings, 1 designates a sleeve, which may be constructed of any suitable resilient material, preferably rubber, and which is designed to fit the inflating valve stem 2. The sleeve is preferably designed for use in connection with inflating valve stems of metal rims of wire wheels. This rubber sleeve is provided with integral collars 3 and 4, at its opposite ends, and the collar 3 is designed to engage the metal rim 4$^b$ of the wire wheel, while the collar 4 is designed to be engaged by the open end of the rubber dust cap 5, which also fits telescopically upon the inflating valve stem 2. The rubber valve stem sleeve is provided with a plurality of longitudinally extending ribs 4$^a$, which not only constitute means to stiffen the sleeve, but also constitute means to permit the fingers of an operator to firmly grasp the sleeve without slipping, in order to apply it to the inflating valve stem. The sleeve 1 also serves to permit inner tubes usually used in connection with wooden rims, to be employed in connection with metal rims, in order that when the inflating valve tube passes through the relatively thin metal rim, the excessive length of the valve tube may be covered, and taken up, particularly at a point between the open end of the dust cap and the rim. The sleeve further serves to preclude dust and other foreign matter, such as sand and other gritty substances entering the opening in the rim, as well as preventing the entrance of moisture, such as water or the like through the opening in the rim, hence avoiding the decay of the inner tube. When an inner tube is applied to a tire on the rim, subsequently to having repaired the tube, the inflating valve tube is passed through an opening in the rim, to receive the pump tube. Unless some means, such as a nut is applied to the inflating valve tube adjacent the face of the rim, the inner tube of a tire is very apt to become displaced, prior to inflation. The sleeve 1 serves to engage the inflating valve tube, permitting the threads thereof to bite into the sleeve, so that the sleeve may firmly engage the rim and retain the inner tube in position adjacent the rim, while the inner tube is being inflated. The valve stem dust cap is designed to be constructed of any suitable material, such as rubber, or a composition of rubber and canvas, and may telescopically fit any construction of inflating valve stem, either smooth or threaded. One end of the valve stem dust cap is open and is provided with an integral collar 6 to reinforce the open end of the cap and is designed to engage one end of the valve stem sleeve, in order to insure a reinforced junction at the point of engagement between the sleeve and the cap, while the other end of the valve stem dust cap is closed, and rounded as indicated at 6ª. The outer circumference of the valve stem dust cap is provided with annular ribs 7, which are intersected by longitudinally extending ribs 8, and which act as means for reinforcing and strengthening the valve stem dust cap and act more particularly in preventing the hand or finger from slipping when forcing the valve stem dust cap telescopically upon the inflating valve stem.

In Fig. 4, the inflating valve stem dust cap is shown as applied to an inflating valve stem of a wheel having a wood felly, and in in this case the end of the dust cap having the collar 6 contacts with the face of the wood rim 4ᵇ of the wheel.

By means of the valve stem dust cap applied to a stem of the wood felly of a wheel, and as applied together with a valve stem sleeve to a valve stem of the metal rim of a wire wheel, act to prevent dust, sand or dirt, or other foreign matter from entering the valve stem and collecting upon exposed threads of the stem.

By the provision of an inflating valve stem sleeve and valve stem dustcap, it is possible to protect inflating valve stems of wheels either having metal rims, or wood fellies. When it is desired to protect the valve stem of a wheel having a wood felly the valve stem dust cap is employed separately, but when protecting a valve stem of a wire wheel having a metal rim, the sleeve and the dust cap are used conjunctively, the former is telescopically fitted to the stem, while the latter is subsequently fitted to the stem, so that the entire heretofore exposed valve stem may be covered and protected.

Referring to Figs. 1 and 2 and also Fig. 4, the spaces between the longitudinal and annular ribs 8 and 7 are clearly shown, and these spaces afford means to be engaged by the balls of the fingers of the hand, for forcing the valve stem dust cap on and off the inflating valve stem. The spaces between the ribs 4ª of the sleeve are also designed for the same purpose, namely to force the sleeve on and off the inflating valve stem. It will be noted that the drawing discloses the valve stem dust caps as being applied to inflating valve stems either threaded or non-threaded. Furthermore, should an inflating valve stem of a wheel having a wood felly being long enough, it it obvious that the valve stem dust sleeve and valve stem dust cap may be applied thereto, in the same manner as is applied to a valve stem of the metal rim of a wire wheel. Owing to the dust cap being constructed of suitable pliable material, preferably rubber, its closed end and the wall of the cap exerts constant pressure on the holder of the valve stem to retain the holder in place, and prevent the same from unscrewing.

The invention having been set forth, what is claimed as new and useful is:

1. The combination with an inflating valve stem including an inflating check valve holder, of a valve stem dust cap having its exterior provided with longitudinally and annularly extending ribs, the annular ribs being spaced and the longitudinal ribs being spaced and intersecting the annular ribs, one end of the dust cap being open, and its opposite end closed, a spacing sleeve between the open end of the dust cap and the rim of the wheel, said dust cap being constructed of pliable material, whereby the wall and the closed end of the dust cap may bear yieldably and with pressure on the check valve holder to hold the same in position and prevent it from unscrewing from the stem and preventing particles from entering the open end of the holder, said longitudinally and annularly extending ribs adapted to be engaged by the fingers to screw the pliable cap on the stem, the pliable cap constantly bearing yieldably on the threads of the stem to prevent unscrewing of the cap.

2. The combination with an inflating valve stem including an inflating check valve holder, of a valve stem dust cap fitting the inflating valve stem and having its bore of less diameter than the stem, whereby the wall of the closed end of the cap may bear yieldably with pressure on the check valve holder and prevent it from unscrewing, a spacing sleeve of pliable material between the open end of the cap and the rim of the wheel, serving to accommodate stems of excessive lengths and hold them in place, said sleeve also serving to preclude foreign matter entering the opening of the rim through which the stem passes.

In testimony whereof I hereunto affix my signature.

ELBA O. COLLINS.